United States Patent [19]

Kolonia

[11] 4,044,808

[45] Aug. 30, 1977

[54] SPLITTING ASSEMBLY

[76] Inventor: Robert A. Kolonia, RD No. 3, Box 318, Agnes Lane, Milford, N.J. 08848

[21] Appl. No.: 688,287

[22] Filed: May 20, 1976

[51] Int. Cl.[2] ........................ A47J 4/02; B26B 23/00; B27L 7/00

[52] U.S. Cl. ........................ 145/2 R; 144/193 C; 144/193 D

[58] Field of Search .................... 145/2 R; 144/193 C, 144/193 D

[56] References Cited

U.S. PATENT DOCUMENTS

| | | | |
|---|---|---|---|
| 561,000 | 5/1896 | Karns | 145/2 R |
| 1,272,538 | 7/1918 | Sandidge | 145/2 R |
| 3,749,365 | 7/1973 | Van Gompel | 254/104 |
| 3,865,163 | 2/1975 | Root | 144/193 A |
| 3,982,572 | 9/1976 | Kortendick | 254/104 |

FOREIGN PATENT DOCUMENTS

| | | | |
|---|---|---|---|
| 597,743 | 9/1925 | France | 145/2 R |
| 3,925 | 6/1919 | Netherlands | 145/2 R |

*Primary Examiner*—James L. Jones, Jr.
*Assistant Examiner*—J. T. Zatarga
*Attorney, Agent, or Firm*—Lowe, King, Price & Markva

[57] ABSTRACT

The device comprises a head portion having a cutting edge with a pair of lever members mounted on opposing sides of the head portion. The lever members are pivotally mounted at one end thereof to move in a crossed relationship with respect to each other and to swing the outer end thereof from a resting position outwardly with respect to the head portion. The outer end of each lever member has a structural configuration effective to cause the swinging movement of the lever members upon contact with the object to be split. The outer end of each lever member contacts the object immediately after the cutting edge contacts the object. The lever members are effective to provide forces via their end portions against opposing sides of a cut formed by the cutting edge and thereby enhance splitting of the object against which the cutting edge has been thrust. The lever members are pivotally mounted to bosses directly attached to the head portion.

14 Claims, 7 Drawing Figures

SPLITTING ASSEMBLY

BACKGROUND OF THE INVENTION

This invention relates to a device useful for splitting objects. More specifically, the invention is directed to a hand-operated axe having an axe head with levers or dogs movably mounted thereon. Wedge splitting is extremely old and many devices have been developed throughout the years. However, these prior art devices generally include means for spreading the object, usually wood, apart after a wedge has been driven into the wood. Such prior art wedge splitters comprise two-part wedges or wedges with hinged halves. A further wedge section is then used to effect the final spreading of the halves apart. These prior art wedges have unconnected parts and require successive operations.

Another prior art splitter head is disclosed in U.S. Pat. No. 3,865,163. This prior art splitting wedge is used for wooden blocks or logs and has an integral post projecting from the wedge away from the edge of the wedge. Spreader arms are pivotally disposed on the centerline of the wedge on each side of the post. Thus, the spreader arms pivotally swing about an axis which is parallel to the wedge edge and directly on the centerline of the assembly. The pivot axis is spaced from the wedge and the spreader arms are normalized so that their free ends contact the wedge at its end opposite its spreading edge. The free ends normally contact the wedge along the faces of the wedge which intersect to form the spreading wedge edge.

The spreader arms of the prior art device are not mounted on the head portion of the wood splitter. Furthermore, the wedge is used in conjunction with a press-type wood splitter incorporating the use of a hydraulic cylinder having its piston rod directly attached to the wedge being forced into the object to be split. Thus, this prior art device is deemed cumbersome to use and not as productive as a device which may be manually used. A manually operated device is much more suited to the capacity of the operator rather than to the capacity of the machine such as disclosed in the prior art patent.

PURPOSE OF THE INVENTION

The primary object of the invention is to provide a device useful for splitting objects such as wood and logs and is adaptable to a manually-operated implement.

A further object of this invention is to provide an improved axe implement incorporating means for splitting an object when the cutting edge of the implement is thrust thereagainst.

Another object of this invention is to provide a device that is simple in construction and easily maneuverable for the purpose of splitting objects such as logs and wood pieces.

A still further object of this invention is to overcome the disadvantages associated with splitting devices known in the prior art.

SUMMARY OF THE INVENTION

The invention as described herein comprises a device having a head portion with a cutting edge and a means movably mounted on the head portion. The movable means is effective to move away from the head portion when the cutting edge thereof is thrust against an object to be split. As the cutting edge of the head portion enters the object, it creates a crack into which the movable means enter and create a force sufficient to spread the two pieces of the object apart. Thus, the object is split through the interaction of the thrusting of the cutting edge followed by the immediate contact of the outer end of the movable means with the two partially separated portions of the object being split.

In a specific embodiment of the invention, the movable means comprises lever means that are pivotally mounted at one end thereof to swing the outer end thereof from a resting position outwardly with respect to the head portion. The outer end of the lever means has a structural configuration effective to cause the outward swinging of the lever means when coming in contact with the object being split. The outer end of the lever means has a first surface extending outwardly from and in a direction transverse to the centerline of the head portion. This first surface makes the initial contact with the outer surface of the object being split. Subsequently, a second surface of the outer end portion is effective to contact the opposing sides of a cut that is formed when the cutting edge is thrust against the object. The lever members then pivot toward each other and with each outer end swinging outwardly away from the head portion. Thus, the halves of the object are spread apart away from the cut formed by the cutting edge. Thus, the second surface of the outer end portion must actually enter into the cut formed by the cutting edge.

The lever means are pivotally mounted at a pivot point laterally displaced from the centerline of the head portion. Biasing means such as magnets or spring members are used to urge the lever members to a resting position against the side of the head portion. This combination of structural elements makes it possible for the head portion to be mounted on an axe handle and thus provide a manually-operated axe that is particularly suited to the capabilities and characteristics of the operator.

BRIEF DESCRIPTION OF DRAWINGS

Other objects of this invention will appear in the following description and appended claims, reference being made to the accompanying drawings forming a part of the specification wherein like reference characters designate corresponding parts in the several views.

DESCRIPTION OF SPECIFIC EMBODIMENTS

Figure 1:
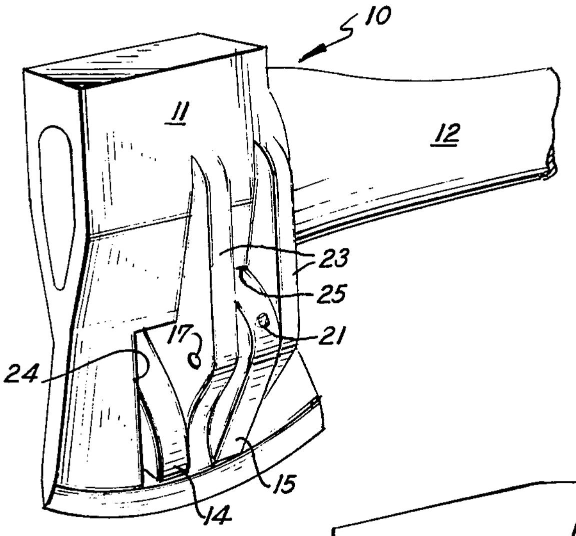
FIG. 1 is a perspective view of a device made in accordance with this invention.
Figure 2:
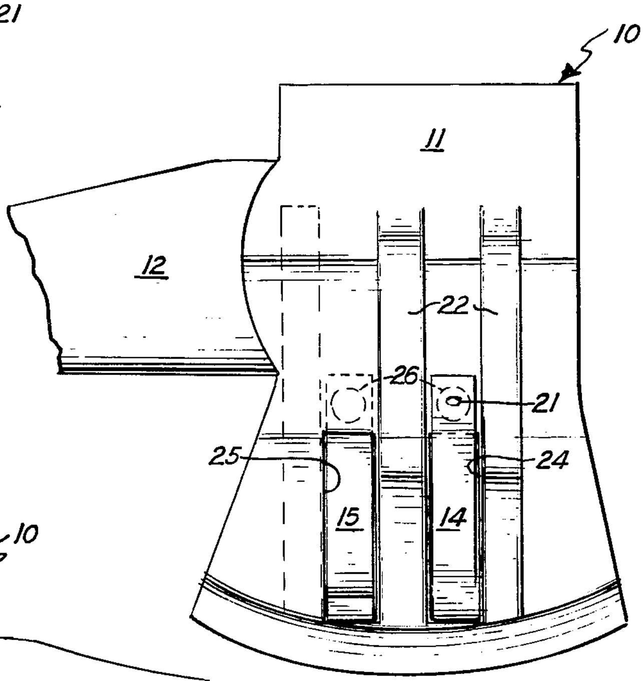
FIG. 2 is a side-elevational view of the device of FIG. 1.
Figure 3:
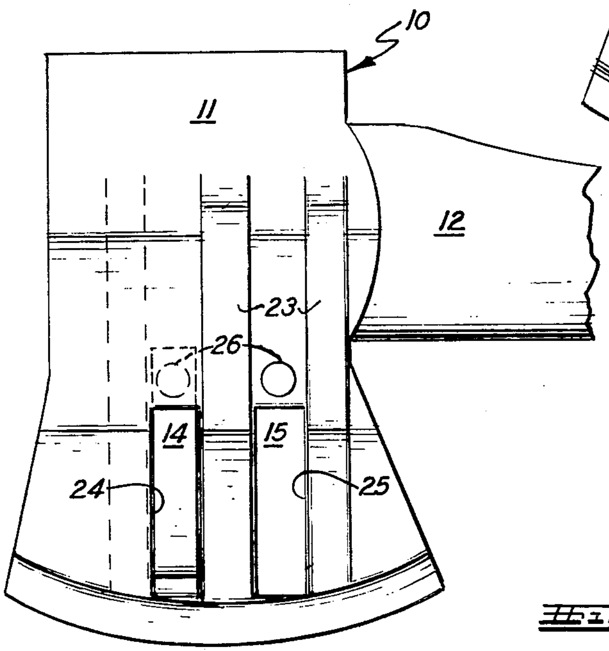
FIG. 3 is a side-elevational view of FIG. 1 with one lever member omitted from the device.

More specifically, referring to the drawings, the splitting device, generally designated 10, includes a head portion or member 11 mounted on a handle 12. Lever members 14 and 15 are pivotally mounted with their outer ends being disposed at a location behind the cutting edge 13. Lever members 14 and 15 are mounted on pivot pins 17 located on pivot points 16 which are laterally displaced with respect to the centerline of the head portion. The centerline extends substantially through the cutting edge 13. The first lever member 14 is fixed between bosses 22 and the second lever member 15 is between bosses 23 on the opposing side of the head portion 11. A lubricating hole 21 in lever members 14 and 15 is used to apply lubricant to the pivot pins 17.

Figure 4:
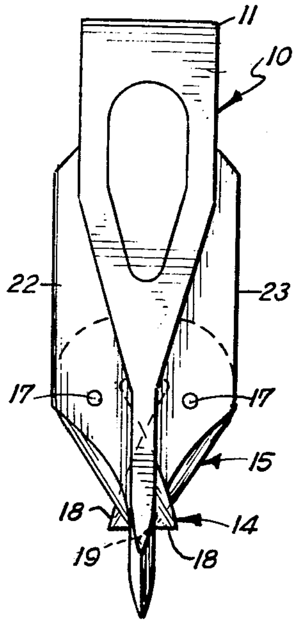
FIG. 4 is a top-plan view of the device of FIG. 2 with the lever members in a resting position.
Figure 5:
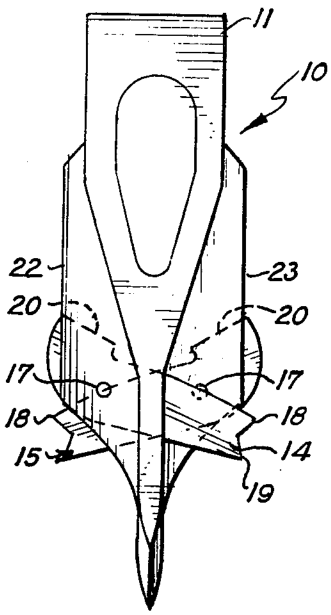
FIG. 5 is a top-plan view of the device with the lever members in a working position.
Figure 6:
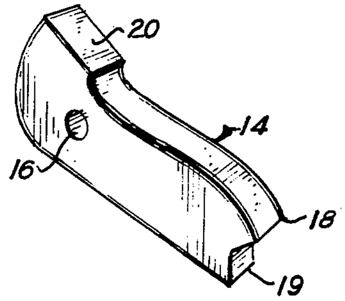
FIG. 6 is a perspective view of a lever member used with the device made in accordance with this invention.

A first opening 24 receives lever member 14 and a second opening 25 receives lever member 15. Lever members 14 and 15 swing between a resting position as shown in FIG. 4, and the ultimate working position as shown in FIG. 5. When in the resting position, a first outer end surface 18 extends outwardly from the head 11. A second outer end surface 19 is disposed along the side forming the cutting edge and within the openings 24 and 25 as shown. In a working position, the lever members 14 and 15 cross with respect to each other to cause the outer ends thereof to swing outwardly with respect to the head portion.

Abutment face 20 is located at the pivot end of the lever members 14 and 15. Abutment face 20 is contiguous to the surface of head portion 11 when lever members 14 and 15 are in the resting position as shown. A biasing means is required to maintain the lever members 14 and 15 in a resting position when the device 10 is being thrust against an object to be split. In a first embodiment, magnets 26 are embedded into the surface of the head portion 11. Magnets 26 function to magnetically urge the lever members 14 and 15 against the surface of head portion 11 and are disposed to operate on the abutment face 20 of each lever 14 and 15.

Figure 7:
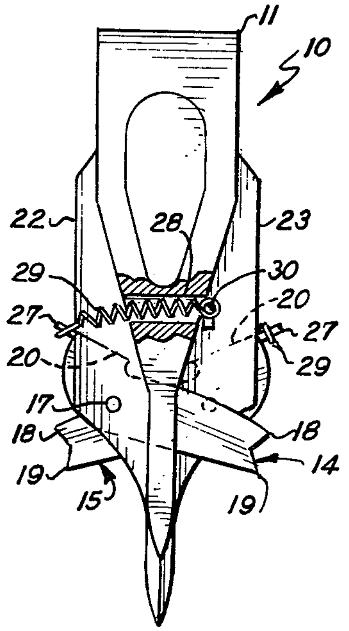
FIG. 7 is a further embodiment of a device made in accordance with this invention.

In another embodiment as shown in FIG. 7, a spring 29 is attached at one end to a tab 27 of each lever member 14 and 15. The other end of spring 29 is fixed with an anchor pin 30 on the opposite side of head portion 11. Spring 29 extends through the hole 28 as shown. Thus a spring 29 is connected to provide a positive force for holding the abutment face 20 of each of the lever members 14 and 15 against the outside surfaces of the head portion 11. It is contemplated that numerous methods for biasing the lever members in place may be used. This includes the use of magnets disposed on the lever members and other mechanisms for fastening a spring means between the head and the lever members 14 and 15.

In operation, the device 10 is manually thrust against an object such as a piece of wood through the use of the handle 12 in a manner substantially the same as using a conventional axe implement. The weight of device 10 is variable and dependent upon the size of the implement. During the thrusting motion toward the object to be split, lever members 14 and 15 are maintained in their resting position by the biasing means.

Once the cutting edge 11 is thrust against the object, a cut is formed in the surface thereof. The disposition of the outer end surfaces 19 enables them to enter into the opening formed by the cutting edge 11. Thus, the lever members 14 and 15 anchor into the object and as the cutting edge continues to move downwardly throughout the thrusting motion, lever members 14 and 15 pivot outwardly when the outer end surfaces 18 contact the outer surface of the object through which the cutting edge 11 has passed to form the cut. The contact of the outer end surface 18 causes the force of the biasing means to be overcome and the lever members 14 and 15 cross with respect to each other to a working position. Once in the working position, the outer end portions provide forces against the opposing sides of the cut thereby enhancing the splitting of the object.

When splitting logs of a large diameter, it is best to begin striking on the outer edge of the log and work around the outside edge. If the log does not split immediately, it need simply be turned over and struck again from the other side. Logs having knots are placed in a position with the knot facing downwardly. With the device of this invention, it is not necessary to use a chopping block. Any log may be placed on a suitable location directly on the ground.

While the splitting assembly has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. A device useful for splitting objects comprising:

a. a head portion having a cutting edge located substantially on the centerline thereof, b. means movably mounted directly on said head portion, and c. said movable means being effective to move away from the head portion when the cutting edge is thrust against an object, d. said movable means including lever means mounted to pivot about a point at one end thereof and swing the outer end thereof from a resting position outwardly with respect to a first side of the head portion, e. said pivot point being laterally displaced with respect to said centerline and on a side of the head portion opposite said first side, f. said head portion including an opening for receiving the outer end portion of the lever means, g. said outer end portion being disposed at a location with respect to the cutting edge to be effective to enter into a cut made by the cutting edge when thrust against the object and having a structural configuration effective to cause the lever means to pivot about said pivot point.

2. A device a defined in claim 1 wherein:

said outer end being disposed at a location behind the cutting edge.

3. A device as defined in claim 1 wherein:

said outer end portion has a structural configuration effective to cause the lever means to swing outwardly with respect to the head portion from a resting position upon contact with said object.

4. A device as defined in claim 3 wherein:

said outer end portion contacts said object immediately after said cutting edge contacts said object.

5. A device as defined in claim 1 wherein:

said lever means includes a pair of lever members with each member being mounted on opposing sides of the head portion, each said lever member being pivotally mounted about a pivot point at one end thereof to cause the outer end thereof to swing outwardly with respect to the head portion.

6. A device as defined in claim 1 wherein:

said movable means includes biasing means for holding the outer end in said resting position while the cutting edge is being thrust toward an object to be split.

7. A device as defined in claim 6 wherein:

said biasing means includes means for magnetically urging the lever means against the head portion.

8. A device as defined in claim 6 wherein:
said biasing means includes spring means connected at the pivot end of the lever means and at the other end to the head portion.

9. A device as defined in claim 1 wherein:
said lever means includes a pair of lever members with each member being mounted on opposing sides of the head portion,
each said lever member being pivotally mounted about a pivot point at one end thereof so that the lever members cross with respect to each other to cause the outer end thereof to swing outwardly with respect to the head portion, and
spring means being disposed on said head portion and connected to urge each said lever member against said head portion.

10. A device as defined in claim 1 wherein:
said outer portion being effective to provide forces against opposing sides of said cut to enhance splitting of said object.

11. A device as defined in claim 1 wherein:
said outer end having a first surface extending outwardly from and in a direction transverse to the centerline of the head portion and a second surface disposed adjacent the head portion to be effective to contact the opposing sides of a cut that is formed when the cutting edge is thrust against the object.

12. A device as defined in claim 1 wherein:
the head portion comprises an axe head mounted on a handle to form a manually operated device.

13. A device as defined in claim 1 wherein:
said lever means includes an abutment surface disposed at the pivot end thereof and being contiguous to the surface of the head portion when the lever means is in the resting position.

14. In an axe having a head portion mounted on a handle forming a manually operated device, the combination comprising:

a. a cutting edge defined along one side of and located substantially on the centerline of said head portion,
b. movable means including lever means mounted directly on said head portion,
c. said lever means being pivotally mounted at one end thereof to swing the outer end thereof about a pivot point from a resting position outwardly with respect to a first side of the head portion when the cutting edge is thrust against an object to be split, and
d. said movable means including biasing means for holding said outer end in said resting position while the cutting edge is being thrust toward an object to be split,
e. said pivot point being laterally displaced with respect to said centerline and on a side of the head portion opposite said first side,
f. said head portion including an opening for receiving the outer end portion of the lever means,
g. said outer end portion being disposed at a location with respect to the cutting edge to be effective to enter into a cut made by the cutting edge when thrust against the object.

* * * * *